Dec. 13, 1960 R. J. ROMAN ET AL 2,964,683

SHIELDED PRINTED-CIRCUIT CONSTRUCTION

Filed June 24, 1957 2 Sheets-Sheet 1

Robert J. Roman
John M. Moriarty
INVENTORS

BY Daniel I. Mayne
Robert F. Crocker
ATTORNEYS

SHIELDED PRINTED-CIRCUIT CONSTRUCTION

Filed June 24, 1957

Robert J. Roman
John M Moriarty
INVENTORS

BY Daniel I. Mayne
Robert T. Crocker
ATTORNEYS

United States Patent Office 2,964,683
Patented Dec. 13, 1960

2,964,683

SHIELDED PRINTED-CIRCUIT CONSTRUCTION

Robert J. Roman and John M. Moriarty, Rochester, N.Y., assignors to Eastman Kodak Company, Rochester, N.Y., a corporation of New Jersey Filed June 24, 1957, Ser. No. 667,498

6 Claims. (Cl. 317—101)

This application relates to an improved mounting and shielding arrangement for electronic apparatus using printed circuitry. In recent years there has been a definite trend in the electronic art to the use of so-called printed-circuit construction wherein a major portion of the conductors used to interconnect electronic components are formed integrally directly upon the surface of a component-supporting plate, the plate itself customarily being of insulating material. However, certain problems of adequately supporting the components and of electronically shielding a given portion of the circuitry from the remainder have not, up until the present time, been successfully solved.

It is therefore an object of this invention to provide a mounting and shielding construction for use with electronic apparatus using printed circuits or the like, which construction lends itself readily to mass production techniques, provides an effective support for the various components, and provides a readily removable and highly effective shielding means for any desired portion of the apparatus.

A further object is to provide a chassis construction for electronic apparatus wherein a printed-circuit plate or board is utilized to carry the lighter electronic components, and the major portion of the circuitry, and said circuit board is supported from a main chassis plate in spaced parallel relationship thereto, with the heavier components being carried directly from the main chassis plate, and wherein shielding means is provided for shielding a predetermined portion of the circuitry and components on both sides of both of said plates.

Further objects will appear for the following description and claims, especially when considered in the light of the accompanying drawings wherein:

We have chosen for purposes of illustration to show our invention as it might be applied in the construction of an audio amplifier of the type used in conjunction with a sound motion picture projector. However, it will be obvious that the type of construction is equally applicable to many other types of electronic apparatus.

It should also be noted that no attempt has been made to show all the components and circuit connections that would be involved in a complete amplifier, only enough typical examples being shown to illustrate the principle of the invention and to teach those skilled in the art how to apply the invention to any ordinary electronic apparatus.

Figure 1:
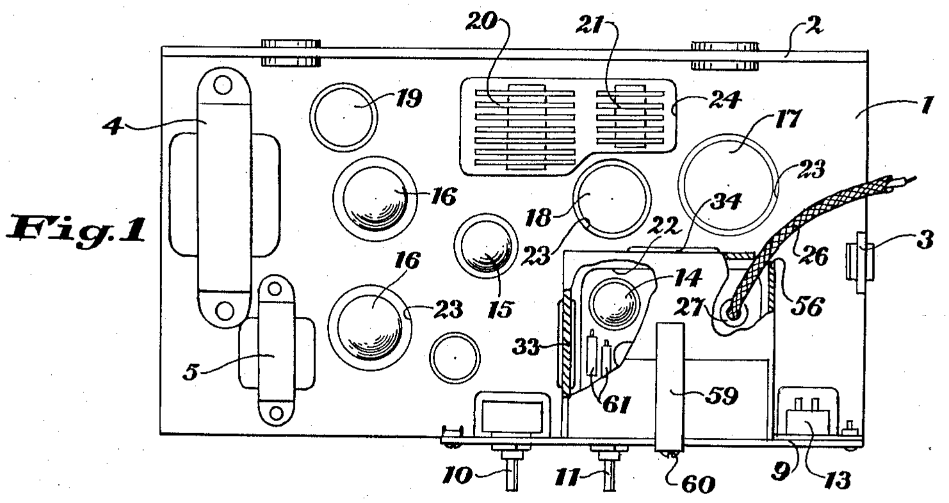
Fig. 1 is a top plan view of an audio amplifier constructed in accordance with the invention.
Figure 2:
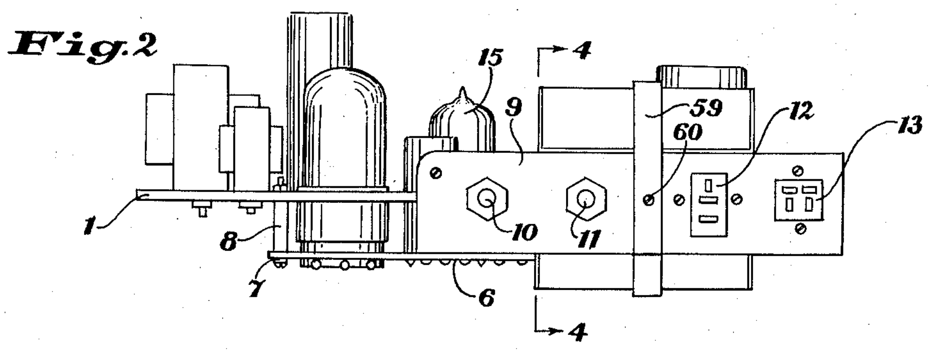
Fig. 2 is a front view thereof.
Figure 3:
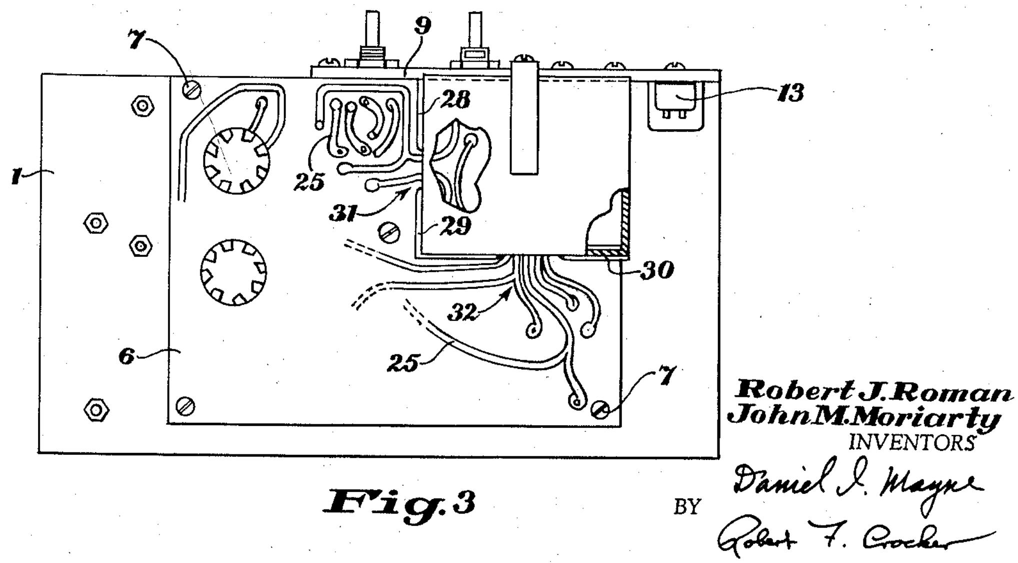
Fig. 3 is a bottom view thereof.

Top, front and bottom views of a typical amplifier construction embodying the invention are shown in Figs. 1–3. This comprises a main supporting plate or chassis 1 of metal, provided along its edges with suitable mounting flanges 2 and 3 by which the complete assembly may be secured to its associated apparatus (not shown). Plate 1 is preferably utilized to directly support the relatively heavy components such as the transformers 4 and 5, for example, shown attached to the upper face of plate 1.

Supported rigidly from plate 1, in spaced, parallel relationship thereto, is a second plate 6 shown as a relatively thin printed-circuit board of insulating material secured to plate 1 by suitable bolts 7 and spacers 8. Also rigidly secured to both plate 1 and board 6 is a metal panel 9 carrying a pair of potentiometers 10, 11 and a pair of cable receptacles 12 and 13, for example.

Most of the remaining components, which will be relatively light weight units, are preferably carried directly from the board or sub-plate 6, on the side thereof facing chassis plate 1. The smaller components, of which resistors 61, 62, etc. (see Figs. 1 and 4) are typical, will lie entirely in the space between plates 1 and 6, while the larger components such as vacuum tubes 14—16, electrolytic condensers 17—19, rectifiers 20, 21, etc., will protrude through suitable openings 22—24 provided for the accommodation thereof in plate 1. Electrical connections between the various components mounted on plate 1 are made by means of conductors 25 formed integrally on the lower surface of plate 6 in accordance with well known "printed-circuit" techniques.

In the amplifier illustrated tube 14 is the input tube, this tube, together with resistors 58 and other associated components not specifically identified, forming the input stage of the amplifier, with the audio input signal adapted to be applied thereto as by a shielded input lead 26 terminating in a connection plug 27. In order to prevent undesired feedback and/or hum pickup it is usually necessary to provide shielding around the input stage of such an amplifier and the shielding arrangement specifically described is therefore shown as being applied to this input stage. This stage is shown as being located adjacent the front corner of plate 6 and, for effective shielding action it is necessary that the components and connections lying on both sides of both plates 1 and 6 in this area be housed within a suitable shield enclosure. In order to obtain this result while still permitting ready access to the input stage for servicing purposes, etc., we have provided an extremely effective and novel arrangement.

To this end, spaced, elongated slots 28, 29 and 30 are provided in plate 6, these slots, together with the outer edges of the plate 6, generally outlining the area to be shielded. As best shown in Fig. 3, the conductors 25 leading to and from the area to be shielded are grouped together as indicated at 31 and 32 so that they pass between the ends of the slots 28, 29 and 30.

Plate 1 is also provided with a pair of elongated slots 33 and 34 generally complementary to the slots 28, 29 and 30, so that the slots in plates 1 and 6 lie in substantially the same planes but are staggered relative to one another.

The shielding means itself comprises a pair of generally complementary shield boxes or cans 35, 36 which may conveniently be formed by bending sheet metal into the form shown. Shield box 35 includes an end wall 37 and side walls 38—41, walls 38 and 39 being provided with notches 42 and 43 so located that the remaining portions 44, 45 and 46 of these walls are adapted to mate with the slots 28, 29 and 30 respectively. The depth of the notches 42 and 43 is such that when the end edges of the side walls engage the inner or lower face of plate 1, openings 48 will be formed beneath plate 6 to provide a passageway for the conductors leading into the shielded area. When thus positioned, the upper edge of wall 40 will engage the underside of plate 1, while the upper edge of wall 41 will engage the lower edge of panel 9.

Figures 4, 5:
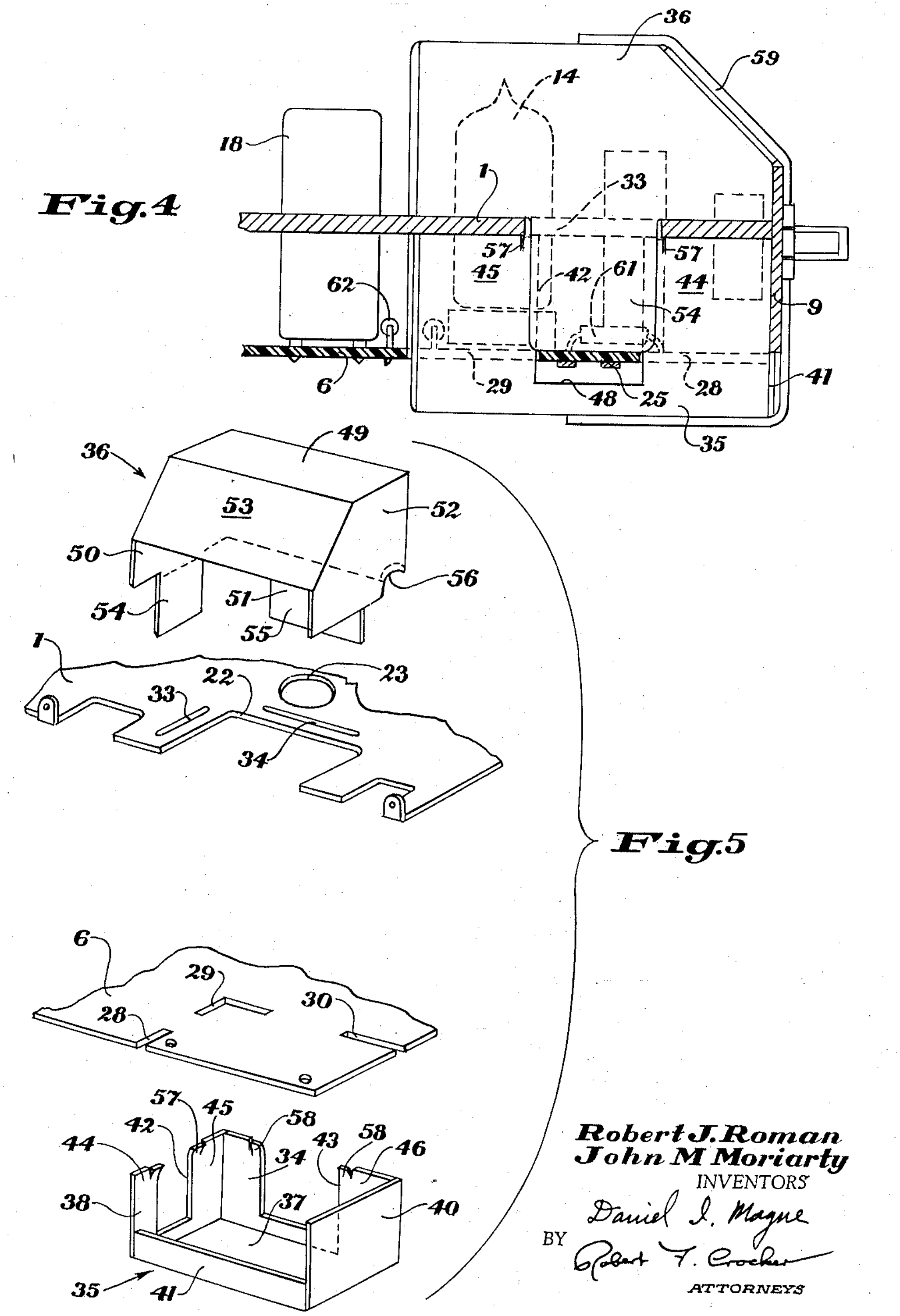
Fig. 4 is a fragmentary sectional view taken in the plane indicated by the line 4—4 in Fig. 2.
Fig. 5 is an exploded view of a portion of the amplifier showing the details of the shielding means utilized.

Shield box 36 includes top end wall 49 and side walls 50—53. Walls 50 and 51 are provided with integral extensions 54 and 55 which are arranged to mate with slots 33 and 34 and to pass therethrough until their lower edges engage the inner or upper face of plate 6. The lower edges of the remainder of walls 50, 51 and 52 then engage the upper face of plate 1 while the lower edge of wall 53 engages the upper edge of panel 9. As shown in Figs. 1 and 5, a notch 56 is provided in the corner of sidewalls 51 and 52 for the accommodation of the shielded input lead 26.

Sidewall extensions 54 and 55 are slightly wider than the notches 42 and 43 so that when both boxes are in their operative position, the extensions 54 and 55 will completely cover the portions of the notches between plates 1 and 6. As shown in Figs. 4 and 5 the upper corners of the wall portions 44 and 45 and 46 may conveniently be offset slightly as indicated at 57 and 58, for example, to serve as surfaces for guiding the extensions 54 and 55 into their proper position during assembly. A generally U-shaped strap 59 is utilized for holding the shield boxes in position, strap 59 being secured to panel 9 as by screw 60.

From the above description it can readily be seen that an extremely effective shielding arrangement is provided. In assembly, the lower section 35 is preferably first placed in position, and then the upper section 36 is applied, the offsets 57 and 58 of the lower section serving to properly guide the extensions 54 and 55 of the upper shield box as the latter is slid into its operative position. Strap 59 may then be applied to maintain both shield sections rigidly in place.

It will be noted that, except for the passageways 48 and 56 for the conductors leading to the interior of the shield boxes, the latter form with the plate 1 and panel 9 a completely shielded enclosure. Both sides of both plates 1 and 6 are shielded in the desired area, and yet the shielding may be readily removed for access to the shielded circuitry by merely removing screw 60 and strap 59.

While the exact form of the shield boxes will, in any particular case, depend upon the shape of the area to be shielded, it is believed that the above specific description clearly sets forth to those skilled in the art the principles and procedures to be followed in utilizing the invention. While the invention is particularly well adapted for use where printed-circuit boards or the like are involved, it could obviously be utilized with other types of electronic apparatus. Many changes could be made from the specific construction shown without departing from the spirit and scope of the invention as defined by the appended claims.

We claim:

1. A chassis assembly for electronic apparatus comprising a pair of plate members, means rigidly supporting said plate members in spaced parallel relationship to one another, and means for effectively shielding a portion only of said assembly on both sides of both said plate members comprising a pair of opposed shield boxes mounted on the outer faces of said plate members, said plate members being provided with a plurality of elongated spaced slots in alignment with the side walls of said boxes, the slots in one plate member being located in staggered complementary relation to those in the other plate member, each of said boxes having integral portions of its side walls extending through the slots in the corresponding plate member and into contact with the inner face of the other plate member, whereby to conjointly constitute a shield between said plate members.

2. A chassis assembly for electronic apparatus comprising a main supporting plate and a subplate rigidly secured thereto in spaced parallel relationship and means for shielding a portion only of said assembly comprising a first shield box having a closed end spaced outwardly from the outer face of said subplate and sidewalls extending toward said plates and provided with notches in the opposite end portions thereof, elongated slots formed in said subplate in alignment with unnotched portions of said side walls, said unnotched portions extending through said slots and into engagement with the inner face of said supporting plate, a second shield box having a closed end and sidewalls and positioned on the outer face of said supporting plate opposite said first shield box, slots formed in said supporting plate opposite said notches, and said second shield box including extensions on its side walls, said extensions passing through said last mentioned slots and into contact with the inner face of said subplate and being slightly wider than said notches whereby they effectively cover the openings formed by said notches between said plates.

3. A chassis assembly as in claim 2 wherein at least some of said notches exceed in depth the distance from the inner face of said supporting plate to the outer face of said subplate, whereby to afford a passageway along the outer face of said subplate for access to the interior of said shield boxes.

4. A chassis assembly as in claim 2 wherein a notch is provided in at least one sidewall of said second shield box to provide a passageway along the outer face of said supporting plate for access to the interior of said shield boxes.

5. A chassis assembly for electronic apparatus, a portion of which is to be shielded, comprising a pair of generally flat plate members which include but extend beyond the portion to be shielded, means rigidly securing said plate members together in spaced generally parallel relationship to one another, and a pair of shield members including wall portions extending outwardly from the outer faces of said plate members in substantial alignment with one another, said plate members being provided with a plurality of spaced elongated slots conjointly outlining at least one side of the area to be shielded, said wall portions having extensions corresponding to said slots and each of which extends inwardly through the associated slot in one of said plate members and across the space between said plate members, the slots in said plate members and the corresponding wall extensions being so positioned relative to one another that the extensions of the wall portions of said pair of shield members laterally overlap one another in the space between said plate members to conjointly form a continuous shield wall across said side of the area to be shielded.

6. A shielded construction for electronic apparatus comprising a metal plate member, a sheet of insulating material supported rigidly from said plate member in spaced parallel relationship thereto, a plurality of electronic components mounted on the inner face of said sheet and a plurality of conductive strips formed integrally with the outer face of said sheet and interconnecting said components in a predetermined manner, and means for electrically shielding those of said components and that portion of said conductive strips located in a predetermined area on said sheet, said plate member and said sheet being provided with generally complementary spaced slots extending along the periphery of said area, said shielding means comprising a first shield box carried on the outer face of said plate with its side walls contacting said plate between the slots therein and having integral extensions of its side walls extending through said slots and into contact with the inner face of said sheet, and a second shield box carried on the outer face of said sheet and having integral extensions of its sidewalls extending through the slots in said sheet into contact with the inner face of said plate and into overlapping relationship with the adjacent sidewall extensions of said first shield box, the depth of the cut-away portion of the sidewall between at least one adjacent pair of sidewall extensions of said second shield box being greater than the spacing of said plate and sheet plus the thickness of said sheet whereby to form an opening in that portion of the sidewall of said second shield box for the passage of said conductor strips into said predetermined area.

References Cited in the file of this patent

UNITED STATES PATENTS

| | | |
|---|---|---|
| 2,722,599 | Himes | Nov. 1, 1955 |
| 2,825,009 | McCoy | Feb. 25, 1958 |

FOREIGN PATENTS

| | | |
|---|---|---|
| 482,106 | Great Britain | Mar. 23, 1938 |
| 121,699 | Australia | July 18, 1946 |
| 588,517 | Great Britain | May 17, 1947 |